(12) United States Patent
Li et al.

(10) Patent No.: US 12,355,569 B2
(45) Date of Patent: Jul. 8, 2025

(54) COMMUNICATION METHOD AND APPARATUS

(71) Applicant: HUAWEI TECHNOLOGIES CO., LTD., Shenzhen (CN)

(72) Inventors: Yunbo Li, Shenzhen (CN); Ming Gan, Shenzhen (CN); Yuchen Guo, Shenzhen (CN); Yifan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 326 days.

(21) Appl. No.: 17/939,400

(22) Filed: Sep. 7, 2022

(65) Prior Publication Data

US 2022/0416946 A1    Dec. 29, 2022

Related U.S. Application Data

(63) Continuation of application No. PCT/CN2021/080072, filed on Mar. 10, 2021.

(30) Foreign Application Priority Data

Mar. 12, 2020    (CN) .......................... 202010172223.1

(51) Int. Cl.
*H04L 1/1607*    (2023.01)
*H04L 5/00*    (2006.01)

(52) U.S. Cl.
CPC .......... *H04L 1/1621* (2013.01); *H04L 5/0055* (2013.01)

(58) Field of Classification Search
None
See application file for complete search history.

(56) References Cited

U.S. PATENT DOCUMENTS

| 2009/0086685 A1* | 4/2009 | Aghili | ................... H04L 1/1685 370/336 |
| 2009/0135773 A1* | 5/2009 | Aghili | ................... H04L 1/1664 370/329 |

(Continued)

FOREIGN PATENT DOCUMENTS

| CN | 106656429 A | 5/2017 |
| CN | 106716901 A | 5/2017 |

(Continued)

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Hassan A Phillips
*Assistant Examiner* — Gautam Sharma
(74) *Attorney, Agent, or Firm* — HAUPTMAN HAM, LLP

(57) ABSTRACT

This application provides a communication method and an apparatus, and relates to the field of communications technologies, to reduce a phenomenon that an acknowledge rule is violated in some scenarios. The method includes: After a receive device receives a first data unit from a transmit device through a first link, the receive device sends receiving status information of the first data unit to the transmit device through the first link, unless the first data unit meets any one of a first preset condition. The first preset condition includes: Correctly received information of the first data unit is fed back through another link, or an acknowledge policy corresponding to the first data unit is no acknowledge. The (Continued)

communication method in embodiments of this application is applied to a multi-link data transmission process.

9 Claims, 8 Drawing Sheets

(56) References Cited

U.S. PATENT DOCUMENTS

| | | | | |
|---|---|---|---|---|
| 2011/0107168 | A1* | 5/2011 | Jung | H04L 1/1614 |
| | | | | 714/748 |
| 2015/0146648 | A1 | 5/2015 | Viger et al. | |
| 2017/0201905 | A1 | 7/2017 | Trainin et al. | |
| 2017/0311310 | A1* | 10/2017 | Ryu | H04W 88/08 |
| 2017/0353887 | A1 | 12/2017 | Kim et al. | |
| 2019/0036651 | A1 | 1/2019 | Chitrakar et al. | |
| 2020/0259595 | A1* | 8/2020 | Seok | H04L 1/1867 |
| 2022/0416946 | A1* | 12/2022 | Li | H04L 1/1614 |
| 2023/0117751 | A1* | 4/2023 | Kneckt | H04W 80/02 |
| | | | | 370/329 |

FOREIGN PATENT DOCUMENTS

| | | |
|---|---|---|
| CN | 109076391 A | 12/2018 |
| CN | 110572244 A | 12/2019 |
| CN | 110601988 A | 12/2019 |
| JP | 2005311920 A | 11/2005 |
| JP | 2019513308 A | 5/2019 |
| WO | 2019157920 A1 | 8/2019 |

OTHER PUBLICATIONS

International Search Report issued in corresponding International Application No. PCT/CN2021/080072, dated May 28, 2021, pp. 1-9.
India Office Action issued in corresponding India Application No. 202237057879, dated May 2, 2023, pp. 1-7.
Russian Office Action issued in corresponding Russian Application No. 2022126392, dated Jun. 24, 2024, pp. 1-11.
Russian Search Report issued in corresponding Russian Application No. 2022126392, dated Jun. 24, 2024, pp. 1-4.
Taewon Song (LG Electronics) Multi-link Acknowledgement, IEEE 802.11-19/1887r3, Jan. 14, 2020 pp. 1-15.
Japanese Notification of Rejection issued in corresponding Japanese Application No. 2022-554444, dated Jun. 4, 2024, pp. 1-6.
Ryuichi Hirata (Sony Corporation):"Discussion on Multi-link Acknowledgement". IEEE 802.11-19/1532r1, Sep. 2019, total 12 pages.
Japanese Office Action issued in corresponding Japanese Patent Application No. 2022-554444, dated Nov. 28, 2023, pp. 1-9.
Extended European Search Report issued in corresponding European Application No. 21768303.6, dated Jun. 19, 2023, pp. 1-7.

* cited by examiner

COMMUNICATION METHOD AND APPARATUS

CROSS-REFERENCE TO RELATED APPLICATIONS

This application is a continuation of International Application No. PCT/CN2021/080072, filed on Mar. 10, 2021, which claims priority to Chinese Patent Application No. 202010172223.1, filed on Mar. 12, 2020. The disclosures of the aforementioned applications are hereby incorporated by reference in their entireties.

TECHNICAL FIELD

This application relates to the field of communications technologies, and in particular, to a communication method and an apparatus.

BACKGROUND

A multi-link device (multi-link device, MLD) is capable of sending data and receiving data on a plurality of links. After a receive device receives a medium access control service data unit (medium access control service data unit, MSDU) from a transmit device, the receive device determines, based on an acknowledge policy (ack policy) subfield in a frame in which the MSDU is located, an acknowledge policy corresponding to the MSDU, to perform different processes. The acknowledge policy indicates whether the MSDU needs to feed back a receiving status, and a manner of feeding back the receiving status.

However, an acknowledge rule in a related technology is that a receiving status of an MSDU received on a link need to be fed back through the link. The acknowledge rule is too strict, and a scenario in which the acknowledge rule is violated exists.

SUMMARY

Embodiments of this application provide a communication method and apparatus, to reduce a phenomenon that an acknowledge rule is violated in some scenarios.

To achieve the foregoing objective, the following technical solutions are used in embodiments of this application.

According to a first aspect, an embodiment of this application provides a communication method. The method includes: After a receive device receives a data unit from a transmit device through a link, if the data unit meets a preset condition, the receive device sends receiving status information of the data unit to the transmit device through the link. The preset condition includes: An acknowledge policy corresponding to the data unit is not set to no acknowledge, and a sequence number SN of the data unit is greater than or equal to a start sequence number SSN in a block acknowledge BA frame. The receiving status information of the data unit is carried in the BA frame.

To be specific, when the receive device feeds back the BA frame, for a data unit that is received on a link, whose acknowledge policy is not set to no acknowledge, and whose SN is greater than or equal to the SSN in the BA frame, a receiving status of the data unit needs to be fed back to the transmit device through the link. This can avoid a phenomenon that some scenarios in a related technology violate an acknowledge rule that "a receiving status of a data unit received on a link needs to be fed back through the link".

In a possible design, the data unit is a medium access control service data unit MSDU or an aggregated medium access control service data unit A-MSDU. To be specific, transmitting the data unit in a form of the MSDU or the A-MSDU can avoid the phenomenon that some scenarios in the related technology violate the acknowledge rule that "a receiving status of a data unit received on a link needs to be fed back through the link".

According to a second aspect, an embodiment of this application provides a communication method. The method includes: After a receive device receives a data unit from a transmit device through a link, if a sequence number SN of the data unit falls within a bitmap range of a scoreboard, the receive device sends receiving status information of the data unit to the transmit device through the link. The scoreboard corresponds to the link, and the receiving status information of the data unit is carried in a block acknowledge BA frame.

To be specific, when the receive device sends the BA frame on a link, for a data unit corresponding to a bit of the SN in the bitmap of the scoreboard, if the data unit is received on the link, a receiving status of the data unit needs to be indicated by using the BA frame. This can expand applicable scenarios, and avoid the phenomenon that some scenarios violate the acknowledge rule that "a receiving status of a data unit received on a link needs to be fed back through the link".

In a possible design, the data unit is a medium access control service data unit MSDU or an aggregated medium access control service data unit A-MSDU. To be specific, transmitting the data unit in a form of the MSDU or the A-MSDU can avoid the phenomenon that some scenarios in a related technology violate the acknowledge rule that "a receiving status of a data unit received on a link needs to be fed back through the link".

According to a third aspect, an embodiment of this application provides a communication method. The method includes: After a receive device receives a first data unit from a transmit device through a first link, the receive device sends receiving status information of the first data unit to the transmit device through the first link, unless the first data unit meets any one of a first preset condition. The first preset condition includes: Correctly received information of the first data unit is fed back through another link, or an acknowledge policy corresponding to the first data unit is no acknowledge.

That is, if the correctly received information of the first data unit is fed back through the another link, or the acknowledge policy of the first data unit is no acknowledge, the receive device does not need to feed back a receiving status of the first data unit on the link for receiving the first data unit. In addition to the foregoing two cases, the receive device needs to feed back the receiving status of the first data unit on the link for receiving the first data unit. This can adapt to scenarios in different acknowledge policies, and avoid a phenomenon that some scenarios violate an acknowledge rule that "a receiving status of a data unit received on a link needs to be fed back through the link".

In a possible design, the communication method in this embodiment of this application further includes: If the acknowledge policy of the first data unit is not set to no acknowledge, the receive device sends the receiving status information of the first data unit to the transmit device through a second link.

That is, the receiving status information of the first data unit whose acknowledge policy is not set to no acknowledge may also be transmitted through the another link other than the first link. This can avoid the phenomenon that some scenarios violate the acknowledge rule that "a receiving status of a data unit received on a link needs to be fed back through the link".

In a possible design, if the acknowledge policy of the first data unit is a block acknowledge, that the receive device sends receiving status information of the first data unit to the transmit device through the first link includes: If a sequence number SN of the first data unit is greater than or equal to a start sequence number SSN in a first block acknowledge BA frame, the receive device sends the receiving status information of the first data unit to the transmit device through the first link. The receiving status information of the first data unit is carried in the first BA frame.

To be specific, when the receive device feeds back the first BA frame, if the acknowledge policy of the first data unit is the block acknowledge, and the SN is greater than or equal to the SSN in the first BA frame, the receiving status of the first data unit is fed back through the first link, to avoid a violation with the acknowledge rule that "a receiving status of a data unit received on a link needs to be fed back through the link".

In a possible design, if the acknowledge policy of the first data unit is the block acknowledge, that the receive device sends receiving status information of the first data unit to the transmit device through the first link includes: If the SN of the first data unit falls within a bitmap range of a first scoreboard, the receive device sends the receiving status information of the first data unit to the transmit device through the first link. The first scoreboard corresponds to the first link, and the receiving status information of the first data unit is carried in a second BA frame.

To be specific, when the acknowledge policy of the first data unit is the block acknowledge, and the SN falls within the bitmap range of the first scoreboard corresponding to the first link, the receiving status of the first data unit is fed back through the first link, to avoid the violation with the acknowledge rule that "a receiving status of a data unit received on a link needs to be fed back through the link".

In a possible design, the first data unit is a medium access control service data unit MSDU or an aggregated medium access control service data unit A-MSDU. To be specific, transmitting the first data unit in a form of the MSDU or the A-MSDU can avoid the phenomenon that some scenarios in a related technology violate the acknowledge rule that "a receiving status of a data unit received on a link needs to be fed back through the link".

According to a fourth aspect, an embodiment of this application provides a communication method. The method includes: After a receive device receives a first data unit from a transmit device through a first link, if an acknowledge policy of the first data unit is a normal acknowledge or implicit block acknowledge request, the receive device sends receiving status information of the first data unit to the transmit device through a first link.

That is, if the acknowledge policy is the normal acknowledge or implicit block acknowledge request, a receiving status of the first data unit received on a link is fed back through the link, and there is no phenomenon that the receiving status of the first data unit is not fed back through the link. This is applicable to an acknowledge rule in a related technology.

In a possible design, the first data unit is a medium access control service data unit MSDU or an aggregated medium access control service data unit A-MSDU. To be specific, transmitting the first data unit in a form of the MSDU or the A-MSDU can avoid the phenomenon that some scenarios in the related technology violate the acknowledge rule that "a receiving status of a data unit received on a link needs to be fed back through the link".

In a possible design, the communication method in this embodiment of this application further includes: After the receive device receives a second data unit from the transmit device through a second link, if an acknowledge policy of the second data unit is a block acknowledge, and a sequence number SN of the second data unit is greater than or equal to a start sequence number SSN in a first block acknowledge BA frame, the receive device sends receiving status information of the second data unit to the transmit device through the second link. The receiving status information of the second data unit is carried in the first BA frame.

To be specific, when the receive device sends the first BA frame, if the acknowledge policy of the second data unit is the block acknowledge, and the SN is greater than or equal to the SSN in the first BA frame, a receiving status of the second data unit is fed back through the second link, to avoid a violation with the acknowledge rule that "a receiving status of a data unit received on a link needs to be fed back through the link".

In a possible design, the second data unit is a medium access control service data unit MSDU or an aggregated medium access control service data unit A-MSDU. To be specific, transmitting the second data unit in a form of the MSDU or the A-MSDU, the phenomenon that some scenarios in the related technology violate the acknowledge rule that "a receiving status of a data unit received on a link needs to be fed back through the link".

According to a fifth aspect, an embodiment of this application provides a communications apparatus. The communications apparatus includes units configured to perform the steps in any one of the foregoing aspects. The communications apparatus may be the receive device in the first aspect, or an apparatus including the receive device. Alternatively, the communications apparatus may be the receive device in the second aspect, or an apparatus including the receive device. Alternatively, the communications apparatus may be the receive device in the third aspect, or an apparatus including the receive device. Alternatively, the communications apparatus may be the receive device in the fourth aspect, or an apparatus including the receive device.

According to a sixth aspect, an embodiment of this application provides a communications apparatus, including a processor and an interface circuit. The processor is configured to communicate with another apparatus through the interface circuit, and perform the communication method provided in any one of the foregoing aspects. There are one or more processors. The communications apparatus may be the receive device in the first aspect, or an apparatus including the receive device. Alternatively, the communications apparatus may be the receive device in the second aspect, or an apparatus including the receive device. Alternatively, the communications apparatus may be the receive device in the third aspect, or an apparatus including the receive device. Alternatively, the communications apparatus may be the receive device in the fourth aspect, or an apparatus including the receive device.

According to a seventh aspect, an embodiment of this application provides a communications apparatus, including a processor. The processor is configured to connect to a memory, and invoke a program stored in the memory, to perform the communication method provided in any aspect. The memory may be located inside the communications apparatus, or may be located outside the communications apparatus. There are one or more processors. The communications apparatus may be the receive device in the first aspect, or an apparatus including the receive device. Alternatively, the communications apparatus may be the receive device in the second aspect, or an apparatus including the receive device. Alternatively, the communications apparatus may be the receive device in the third aspect, or an apparatus including the receive device. Alternatively, the communications apparatus may be the receive device in the fourth aspect, or an apparatus including the receive device.

According to an eighth aspect, an embodiment of this application provides a communications apparatus, including at least one processor and at least one memory. The at least one processor is configured to perform the communication method provided in any one of the foregoing aspects. The communications apparatus may be the receive device in the first aspect, or an apparatus including the receive device. Alternatively, the communications apparatus may be the receive device in the second aspect, or an apparatus including the receive device. Alternatively, the communications apparatus may be the receive device in the third aspect, or an apparatus including the receive device. Alternatively, the communications apparatus may be the receive device in the fourth aspect, or an apparatus including the receive device.

According to a ninth aspect, an embodiment of this application provides a computer-readable storage medium. The computer-readable storage medium stores instructions. When the instructions are run on a computer, the computer can perform the communication method according to any one of the foregoing aspects.

According to a tenth aspect, an embodiment of this application provides a computer program product including instructions. When the computer program product runs on a computer, the computer can perform the communication method according to any one of the foregoing aspects.

According to an eleventh aspect, an embodiment of this application provides a circuit system. The circuit system includes a processing circuit. The processing circuit is configured to perform the communication method according to any one of the foregoing aspects.

According to a twelfth aspect, an embodiment of this application provides a chip. The chip includes a processor. The processor is coupled to a memory. The memory stores program instructions. When the program instructions stored in the memory are executed by the processor, the communication method according to any one of the foregoing aspects is implemented.

According to a thirteenth aspect, an embodiment of this application provides a communications system. The communications system includes the transmit device in any one of the foregoing aspects and the receive device in any one of the foregoing aspects.

For technical effects brought by any design manner of the second aspect to the thirteenth aspect, refer to technical effects brought by different design manners of the first aspect. Details are not described herein again.

DESCRIPTION OF EMBODIMENTS

In the specification and accompanying drawings of this application, the terms "first", "second", and the like are intended to distinguish between different objects or distinguish between different processing of a same object, but do not indicate a particular order of the objects. In addition, terms "including" and "having" and any other variants thereof are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. In embodiments of this application, "a plurality of" includes two or more. In embodiments of this application, the word "example", "for example", or the like is used to represent giving an example, an illustration, or a description. Any embodiment or design scheme described as "example" or "for example" in embodiments of this application should not be explained as being more preferred or having more advantages than another embodiment or design scheme. Exactly, use of the word "example", "for example", or the like is intended to present a related concept in a specific manner.

First, technical terms used in a related technology are described.

1. Multi-Link (Multi-Link, ML)

During development and evolution of a cellular network and a wireless local area network (wireless local area network, WLAN), improving throughput is a continuous technical objective. A protocol for the WLAN system is mainly discussed in the Institute of Electrical and Electronics Engineers (institute of electrical and electronics engineers, IEEE) 802.11 standard group. For example, in standards such as IEEE 802.11a, IEEE 802.11b, IEEE 802.11g, IEEE 802.11n, IEEE 802.11ac, and IEEE 802.11ax, throughput is continuously improved. A technical objective of the next-generation standard IEEE 802.11be is extremely high throughput (extremely high throughput, EHT), and an ML technology is used as one of key technologies.

The ML technology enables data to be sent and received through a plurality of links, so that the data can be transmitted on a larger bandwidth, thereby significantly improving the throughput. A multi-link may be deployed on a multi-band (multi-band), and there may be one or more links on one frequency band. The multi-band may include but is not limited to the following frequency bands: a 2.4 GHz wireless fidelity (wireless fidelity, Wi-Fi) frequency band, a 5 GHz Wi-Fi frequency band, and a 6 GHz Wi-Fi frequency band.

2. Multi-Link Device (Multi-Link Device, MLD)

Figure 1:
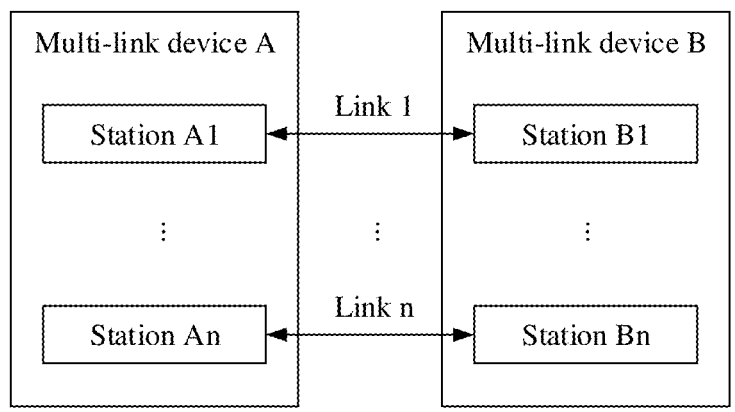
FIG. 1 is a schematic diagram of an architecture of multi-link communication according to a related technology.

An MLD supports sending data and receiving data on a plurality of links. The MLD includes a plurality of stations (station, STA). One STA in an MLD establishes a link with one STA in another MLD for communication. For example, FIG. 1 shows two multi-link devices: a multi-link device A and a multi-link device B. The multi-link device A includes a plurality of stations, which may be respectively denoted as a station A1, a station A2, . . . , and a station An. The multi-link device B includes a plurality of stations, which may be respectively denoted as a station B1, a station B2, . . . and a station Bn. A link between the station A1 and the station B1 is denoted as a link 1. A link between the station An and the station Bn is denoted as a link n.

3. Medium Access Control Service Data Unit (Medium Access Control Service Data Unit, MSDU)

At a medium access control (medium access control, MAC) layer, a basic unit of a data packet is an MSDU. The MSDU is allocated with one sequence number (sequence number, SN).

4. Aggregated Medium Access Control Service Data Unit (Aggregated Medium Access Control Service Data Unit, A-MSDU)

At an MAC layer, a plurality of MSDUs are aggregated into one A-MSDU. The A-MSDU is allocated with one sequence number (sequence number, SN). In this case, one or more MSDUs in the A-MSDU all correspond to a same SN.

5. Medium Access Control Protocol Data Unit (Medium Access Control Protocol Data Unit, MPDU)

One MSDU or one A-MSDU generates one MPDU by adding a frame header and a cyclic redundancy code (cyclic redundancy code, CRC) of the MPDU. A plurality of MPDUs are aggregated into one aggregated medium access control protocol data unit (aggregated medium access control protocol data unit, A-MPDU).

The frame header of the MPDU includes a frame control (frame control) field and a quality of service control (quality of service control) field. The frame control field includes a type (type) subfield. The type subfield indicates a frame type. For example, the type subfield occupies two bits. When a value of the type subfield is "00", it indicates that the frame is a management frame. When a value of the type subfield is "01", it indicates that the frame is a data frame. When a value of the type subfield is "10", it indicates that the frame is a control frame. When a value of the type sub-field is "11", it indicates that the frame is reserved. The QoS control field includes an acknowledge policy (acknowledge policy) subfield. The acknowledge policy subfield is used to set an acknowledge policy, to indicate a manner for sending an acknowledge frame of an MSDU in an MPDU in which the acknowledge policy subfield is located. Different MSDUs in a same MPDU correspond to a same acknowledge policy. As shown in Table 1, when the data frame is transmitted, the acknowledge policy has four states: a normal acknowledge or implicit block acknowledge request (normal acknowledge or implicit block acknowledge request), no acknowledge (no acknowledge), no explicit acknowledge or power save multi-poll (power save multi-poll, PSMP) acknowledge, and a block acknowledge (block acknowledge). The acknowledge policy may be indicated by using two bits (for example, a fifth bit and a sixth bit in the QoS control field).

TABLE 1

| Acknowledge policy | | |
|---|---|---|
| Fifth bit | Sixth bit | Definition |
| 0 | 0 | Normal acknowledge or implicit block acknowledge request |
| 1 | 0 | No acknowledge |
| 0 | 1 | No explicit acknowledge or PSMP acknowledge |
| 1 | 1 | Block acknowledge |

When both a transmit device and a receive device are MLDs, the transmit device sends an MPDU to the receive device. Correspondingly, the receive device receives the MPDU from the transmit device. The receive device performs different processes based on a value of an acknowledge policy subfield in the MPDU. With reference to Table 1, the value of the acknowledge policy subfield may be, for example, but not limited to, the following three cases:

Case 1: A value of the acknowledge policy subfield is "00". Correspondingly, the receive device determines that the acknowledge policy corresponding to the MPDU is a normal acknowledge or implicit block acknowledge request.

If the MPDU is a non-A-MPDU or a very high throughput (very high throughput, VHT) single MPDU frame, the receive device sends an acknowledge frame to the transmit device after receiving the MPDU from the transmit device. The acknowledge frame indicates that the MPDU is correctly received.

If the MPDU is an A-MPDU, the receive device sends a block acknowledge (block acknowledge, BA) frame to the transmit device after the receive device receives, from the transmit device, a physical layer protocol data unit (physical layer protocol data unit, PPDU) in which the MPDU is located, and an interval of preset duration (for example, a short inter-frame space (short inter-frame space, SIFS)) expires. The BA frame includes receiving status information that indicates an MSDU in the MPDU, or includes receiving status information that indicates an A-MSDU in the MPDU.

Case 2: A value of the acknowledge policy subfield is "10". Correspondingly, the receive device determines that the acknowledge policy corresponding to the MPDU is no acknowledge. In this case, the receive device does not feed back a receiving status of the MPDU to the transmit device.

Case 3: A value of the acknowledge policy subfield is "11". Correspondingly, the receive device determines that the acknowledge policy corresponding to the MPDU is a block acknowledge.

After receiving the MPDU from the transmit device, the receive device first does not feed back a receiving status of the MSDU or the A-MSDU in the MPDU, but records the receiving status of the MSDU or the A-MSDU in the MPDU. The transmit device further sends a block acknowledge request (block acknowledge request, BAR) frame to the receive device. Correspondingly, the receive device receives the BAR frame from the transmit device. Alternatively, the transmit device further sends an implicit BAR frame to the receive device. Correspondingly, the receive device receives the implicit BAR frame from the transmit device. After receiving the BAR frame or the implicit BAR frame, the receive device feeds back a block acknowledge frame to the transmit device.

Usually, the transmit device sends QoS data to the receive device in an A-MPDU manner. Correspondingly, the receive device receives the QoS data from the transmit device in the A-MPDU manner. The receive device feeds back a receiving status of the A-MPDU to the transmit device in a block acknowledge manner.

6. BAR Frame

A BAR frame is used to request a receiving status of an MSDU. A start sequence number (start sequence number, SSN) field in the BAR frame indicates an SN of a first MSDU in the MSDU for which a feedback of the receiving status is requested. When the receive device uses a BA frame to feed back receiving status information of the MSDU requested by the BAR frame, the SSN is an SN of the first MSDU corresponding to the BA frame. Alternatively, the BAR frame is used to request a receiving status of an A-MSDU. The SSN field in the BAR frame indicates an SN of a first A-MSDU in the A-MSDU for which a feedback of the receiving status is requested. When the receive device uses the BA frame to feed back receiving status information of the A-MSDU requested by the BAR frame, the SSN is an SN of the first A-MSDU corresponding to the BA frame.

An implicit BAR frame means that the BAR frame is not explicitly transmitted. That the transmit device sends an implicit BAR frame to the receive device may be: After the transmit device sends an MPDU 1 to the receive device, the transmit device does not send a BAR 1 frame to the receive device, but sends an MPDU 2 to the receive device. Correspondingly, after receiving the MPDU 1 from the transmit device, the receive device does not receive the BAR 1 frame from the transmit device, but receives the MPDU 2 from the transmit device. An acknowledge policy of the MPDU 1 is a block acknowledge, and an acknowledge policy of the MPDU 2 is a normal acknowledge or implicit block acknowledge request. In this case, the receive device feeds back receiving statuses of MSDUs in the MPDU 1 and the MPDU 2 to the transmit device, or the receive device feeds back receiving statuses of A-MSDUs in the MPDU 1 and the MPDU 2 to the transmit device.

7. BA Frame

Figure 2:
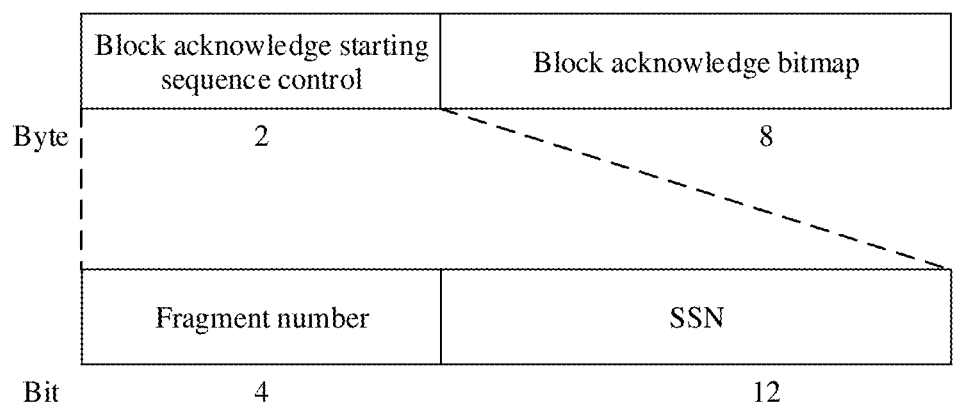
FIG. 2 is a schematic diagram of a structure of a block acknowledge frame according to a related technology.

With reference to FIG. 2, a BA frame includes a block acknowledge starting sequence control (block acknowledge starting sequence control) field and a block acknowledge bitmap (bitmap). The block acknowledge starting sequence control field includes a fragment number (fragment number) field and an SSN field. Herein, a quantity of bytes occupied by the block acknowledge starting sequence control field is 2. The block acknowledge bitmap has different lengths in different types of BA frames. In a basic (basic) block acknowledge frame, a quantity of bytes occupied by the block acknowledge bitmap is 128. In a compressed block acknowledge frame or a multi-traffic identifier (traffic identifier, TID) block acknowledge frame, the quantity of bytes occupied by the block acknowledge bitmap is 8. A quantity of bits occupied by the fragment number field is 4, and a quantity of bits occupied by the SSN field is 12. If an MSDU (or an A-MSDU) is fragmented, the fragment number field indicates a sequence number of fragments of a first MSDU (or an A-MSDU) indicated in the BA frame. If the MSDU (or the A-MSDU) is not fragmented, the fragment number field is set to 0. The compressed block acknowledge frame or the multi-TID block acknowledge frame is used as an example, a fragment number field of the compressed block acknowledge frame or the multi-TID block acknowledge frame is set to 0. The SSN field indicates an SN of the first MSDU (or the A-MSDU) corresponding to the BA frame. The quantity of bits in the block acknowledge bitmap is n. A first bit indicates a receiving status of the MSDU (or the A-MSDU) corresponding to the SSN. A ith bit in the block acknowledge bitmap indicates a receiving status of an MSDU (or an A-MSDU) whose SN is (SSN+i−1). i=1, 2, . . . , n−1, n. If a bit in the block acknowledge bitmap is set to 1, it indicates that an MSDU (or an A-MSDU) corresponding to the bit is received correctly; if a bit in the block acknowledge bitmap is set to 0, it indicates that an MSDU (or an A-MSDU) corresponding to the bit is not received correctly.

However, in an ML, to improve throughput, reduce latency, or implement load balancing, traffic data with a same traffic identifier (traffic identifier, TID) may be transmitted from the transmit device to the receive device through a plurality of links. A receiving status of the traffic data received on one of the plurality of links may be transmitted from the receive device to the transmit device on another available link in the plurality of links. For an MSDU, there is extra latency in replying to a receiving status of the MSDU across links. In this way, if a bit corresponding to an MSDU in the BA frame is set to 0, there may be two cases. A STA corresponding to a link that transmits the MSDU does not correctly receive the MSDU. Although the STA corresponding to the link that transmits the MSDU correctly receives the MSDU, the STA does not transmit, in time, information "the MSDU is correctly received" to a STA corresponding to another link. The receive device also cannot learn a value of latency of cross-link transmission. In this way, if the receive device receives the BA frame through the another link, and the bit corresponding to the MSDU in the BA frame is set to 0, the receive device cannot determine the receiving status of the MSDU. Similarly, if MSDUs are aggregated into an A-MSDU and transmitted by using the A-MSDU, because one A-MSDU corresponds to one SN, a same problem also exists. For ease of description, the MSDU is used as an example for description in embodiments of this application, but all procedures are applicable to the MSDU or the A-MSDU.

Figure 3:
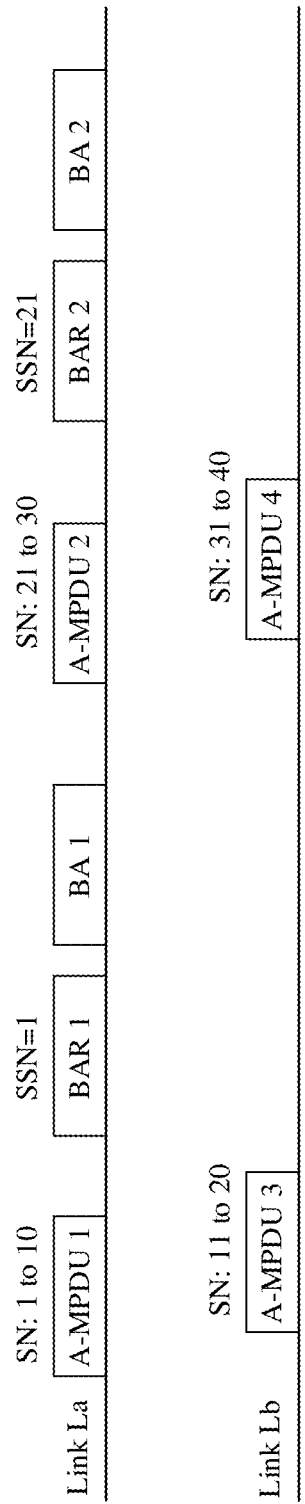
FIG. 3 is a schematic diagram of a process of a communication method according to a related technology.
Figure 4:
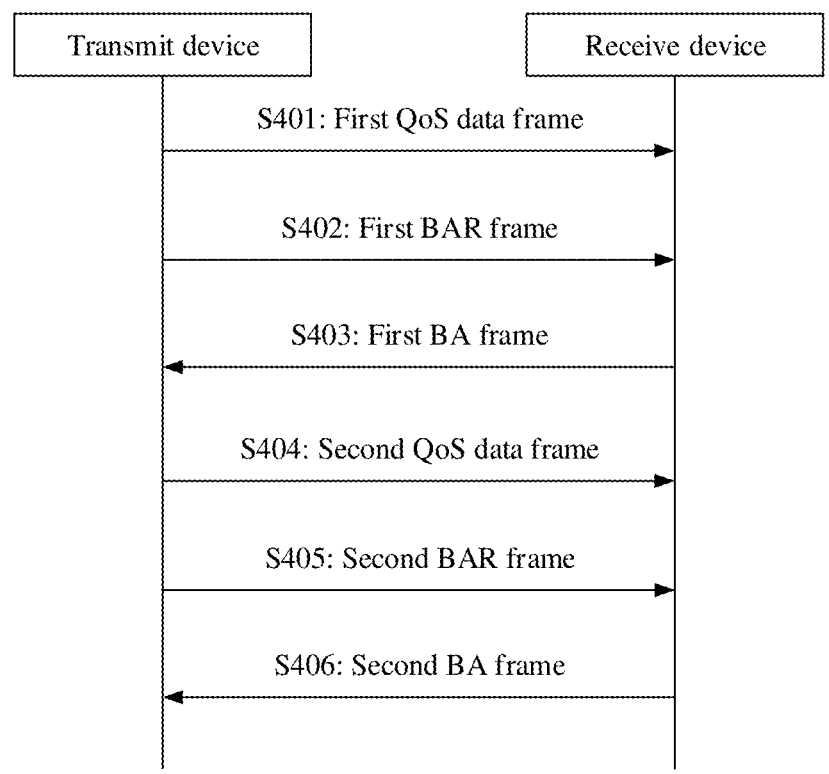
FIG. 4 is a schematic flowchart of a communication method according to a related technology.

For simplicity, a multi-link acknowledge rule is limited in a related technology. That is, a receiving status of a QoS data frame that is identified by a traffic identifier (traffic identifier, TID) and that is received on a link is replied through the link, or may be replied through another available link. However, the acknowledge rule is too strict and cannot be applied to some scenarios. Herein, a scenario to which the acknowledge rule is inapplicable may be, for example, but is not limited to, the following two scenarios:

Scenario 1: With reference to FIG. 3 and FIG. 4, the following steps are performed between a transmit device and a receive device.

S401: The transmit device sends a first QoS data frame to the receive device through two links. Correspondingly, the receive device receives the first QoS data frame from the transmit device through the two links.

For example, with reference to FIG. 3, the two links may be denoted as a link La and a link Lb. An A-MPDU transmitted through the link La is denoted as an A-MPDU 1. A value range of an SN corresponding to an MSDU in the A-MPDU 1 is 1 to 10. An A-MPDU transmitted through the link Lb is denoted as an A-MPDU 3. A value range of an SN corresponding to an MSDU in the A-MPDU 3 is 11 to 20. There are two first QoS data frames: the A-MPDU 1 and the A-MPDU 3. Each acknowledge policy of the first QoS data frame is a block acknowledge.

S402: The transmit device sends a first BAR frame to the receive device through a first link. Correspondingly, the receive device receives the first BAR frame from the transmit device through the first link.

For example, with reference to FIG. 3, the first link is the link La. The first BAR frame is a BAR 1 frame. A value of an SSN of the BAR 1 frame is set to 1, which is used to request a receiving status of an MSDU whose SN is greater than or equal to 1.

S403: The receive device sends a first BA frame to the transmit device through the first link. Correspondingly, the transmit device receives the first BA frame from the receive device through the first link.

For example, with reference to FIG. 3, the first link is the link La. The first BA 1 frame is a BA 1 frame. The BA 1 frame includes receiving status information of MSDUs whose SNs are equal to 1 to 20. In a block acknowledge bitmap of the BA 1 frame, if all bits corresponding to SN equal to 1 to 20 are set to 1, the transmit device performs S404.

S404: The transmit device sends a second QoS data frame to the receive device through two links. Correspondingly, the receive device receives the second QoS data frame from the transmit device through the two links.

For example, with reference to FIG. 3, the two links are still the link La and the link Lb. An A-MPDU transmitted through the link La is denoted as an A-MPDU 2. A value range of an SN corresponding to an MSDU in the A-MPDU 2 is 21 to 30. An A-MPDU transmitted through the link Lb is denoted as an A-MPDU 4. A value range of an SN corresponding to an MSDU in the A-MPDU 4 is 31 to 40. There are two second QoS data frames: the A-MPDU 2 and the A-MPDU 4. Each acknowledge policy of the second QoS data frame is a block acknowledge.

S405: The transmit device sends a second BAR frame to the receive device through the first link. Correspondingly, the receive device receives the second BAR frame from the transmit device through the first link.

For example, with reference to FIG. 3, the first link is still the link La. The second BAR frame is a BAR 2 frame. The transmit device has determined that the receive device correctly receives the MSDUs whose SNs are equal to 1 to 20. Therefore, a value of an SSN of the BAR 2 frame is set to 21, which is used to request a receiving status of an MSDU whose SN is greater than or equal to 21.

S406: The receive device sends a second BA frame to the transmit device through the first link. Correspondingly, the transmit device receives the second BA frame from the receive device through the first link.

For example, with reference to FIG. 3, the second BA frame is a BA 2 frame. The BA 2 frame includes receiving statuses of MSDUs whose SNs are equal to 21 to 40.

It can be learned that the MSDUs whose SNs are equal to 11 to 20 are received through the link Lb, but receiving statuses of the MSDUs whose SNs are equal to 11 to 20 are not fed back through the link Lb. Because the two links share one SN space and one reorder buffer (reorder buffer), values of SNs of different MSDUs transmitted on the two links are different. After the BAR 2 frame sets a value of the SSN to 21, even if a BAR 3 frame is sent through the link Lb to request a BA 3 frame, an SSN of the BA 3 frame cannot be less than 21. Therefore, the receiving statuses of the MSDUs whose SNs are equal to 11 to 20 no longer have an opportunity to be fed back on the link Lb, which violates an acknowledge rule in a related technology.

Figure 5:
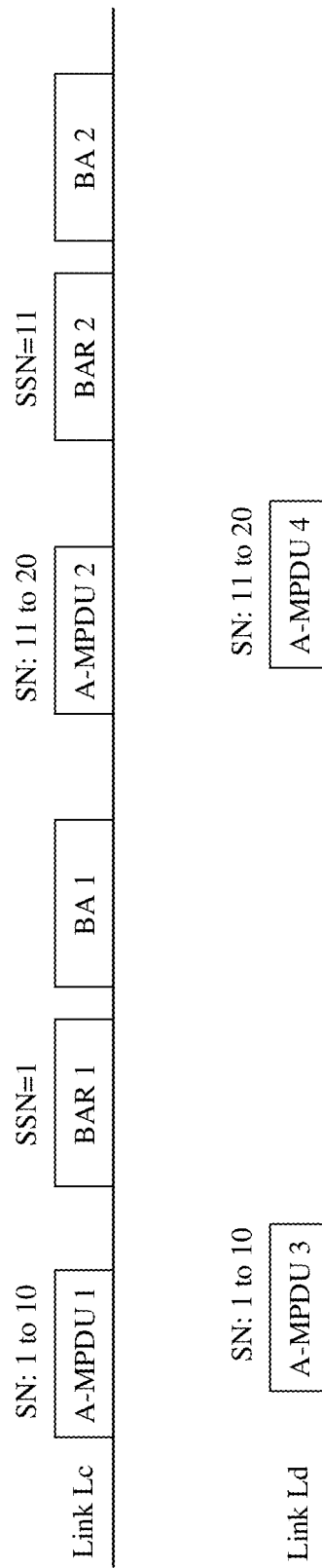
FIG. 5 is a schematic diagram of a process of another communication method according to a related technology.
Figure 6:
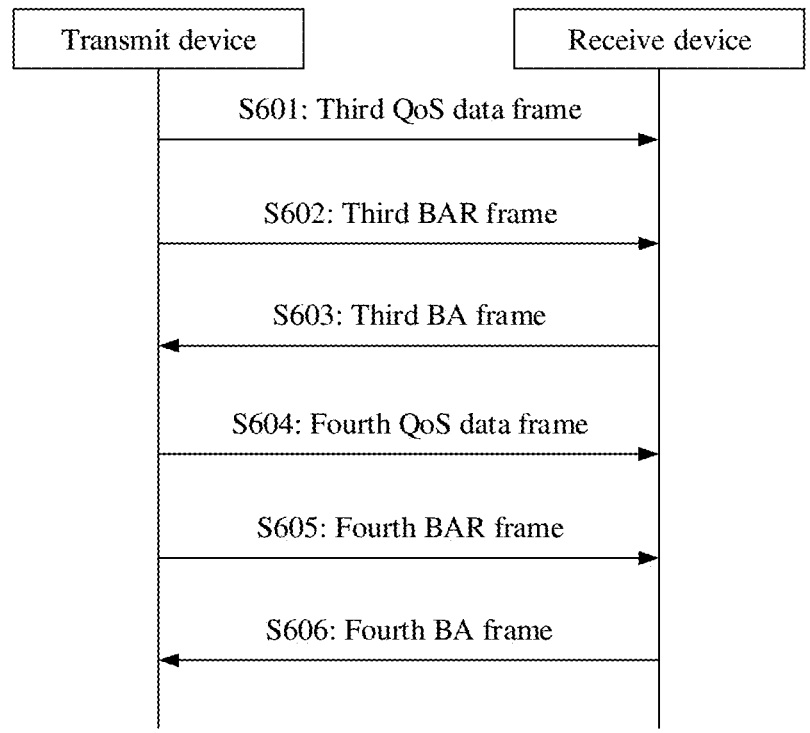
FIG. 6 is a schematic flowchart of another communication method according to a related technology.

Scenario 2: With reference to FIG. 5 and FIG. 6, the following steps are performed between a transmit device and a receive device.

S601: The transmit device sends a third QoS data frame to the receive device through two links. Correspondingly, the receive device receives the third QoS data frame from the transmit device through the two links.

For example, with reference to FIG. 5, the two links may be denoted as a link Lc and a link Ld. An A-MPDU transmitted through the link Lc is denoted as an A-MPDU 1. A value range of an SN corresponding to an MSDU in the A-MPDU 1 is 1 to 10. An A-MPDU transmitted through the link Ld is denoted as an A-MPDU 3. A value range of an SN corresponding to an MSDU in the A-MPDU 3 is also 1 to 10. That is, MSDUs whose SN values range from 1 to 10 are transmitted through the two links. There are two first QoS data frames: the A-MPDU 1 and the A-MPDU 3. Each acknowledge policy of the first QoS data frame is a block acknowledge.

S602: The transmit device sends a third BAR frame to the receive device through a third link. Correspondingly, the receive device receives the third BAR frame from the transmit device through the third link.

For example, with reference to FIG. 5, the third link is the link Lc. The third BAR frame is a BAR 1 frame. A value of an SSN of the BAR 1 frame is set to 1, which is used to request a receiving status of an MSDU whose SN is greater than or equal to 1.

S603: The receive device sends a third BA frame to the transmit device through the third link. Correspondingly, the transmit device receives the third BA frame from the receive device through the third link.

For example, with reference to FIG. 5, the third link is the link Lc. The third BA frame is a BA 1 frame. The BA 1 frame includes receiving statuses of the MSDUs whose SNs are equal to 1 to 10. In a block acknowledge bitmap of the BA 1 frame, if all bits corresponding to SN equal to 1 to 10 are set to 1, the transmit device performs S604.

S604: The transmit device sends a fourth QoS data frame to the receive device through the two links. Correspondingly, the receive device receives the fourth QoS data frame from the transmit device through the two links.

For example, with reference to FIG. 5, the two links are still the link Lc and the link Ld. An A-MPDU transmitted through the link Lc is denoted as an A-MPDU 2. A value range of an SN corresponding to an MSDU in the A-MPDU 2 is 11 to 20. An A-MPDU transmitted through the link Ld is denoted as an A-MPDU 4. A value range of an SN corresponding to an MSDU in the A-MPDU 4 is also 11 to 20. That is, MSDUs whose SN values range from 11 to 20 are transmitted through the two links. There are two fourth QoS data frames: the A-MPDU 2 and the A-MPDU 4. Each acknowledge policy of the fourth QoS data frame is a block acknowledge.

S605: The transmit device sends a fourth BAR frame to the receive device through the third link. Correspondingly, the receive device receives the fourth BAR frame from the transmit device through the third link.

For example, with reference to FIG. 5, the third link is still the link Lc. The fourth BAR frame is a BAR 2 frame. The transmit device has determined that the receive device correctly receives the MSDUs whose SNs are equal to 1 to 10. Therefore, a value of an SSN of the BAR 2 frame is set to 11, which is used to request a receiving status of an MSDU whose SN is greater than or equal to 11.

S606: The receive device sends a fourth BA frame to the transmit device through the third link. Correspondingly, the transmit device receives the fourth BA frame from the receive device through the third link.

For example, with reference to FIG. 5, the fourth BA frame is a BA 2 frame. The BA 2 frame includes receiving statuses of the MSDUs whose SNs are equal to 11 to 20.

It can be learned that although the link Ld also transmits the MSDUs whose SNs are equal to 1 to 10, the receiving statuses of the MSDUs whose SNs are equal to 1 to 10 are not fed back through the link Ld, which still violates an acknowledge rule in a related art.

In view of this, an embodiment of this application provides a communication method. A communications system to which the communication method provided in this embodiment of this application is applicable includes a transmit device and a receive device. The transmit device is an apparatus or a chip that supports wireless communication, for example, an apparatus or a chip that supports 802.11 series protocols, an apparatus or a chip that supports cellular communication, or an apparatus or a chip that supports device-to-device (device to device, D2D) transmission. The transmit device may be a network device, a terminal device, a chip in a terminal device, a chip in a network device, or the like. The transmit device may also be described as a transmit end apparatus, a transmit apparatus, or a sending end apparatus. The receive device is an apparatus or a chip that supports wireless communication, for example, an apparatus or a chip that supports the 802.11 series protocols, an apparatus or a chip that supports cellular communication, or an apparatus or a chip that supports device-to-device (device to device, D2D) transmission. The receive device may be a network device, a terminal device, a chip in a terminal device, a chip in a network device, or the like. The receive device may also be described as a receive end apparatus, a receiving apparatus, or a receiving end apparatus. In addition, the transmit device and the receive device may be two apparatuses in a communications system. For example, the transmit device may be a first apparatus in the communications system, and the receive device may be a second apparatus in the communications system. Data exchange can be performed between the first apparatus and the second apparatus. The network device may be a communications entity such as a communications server, a router, a switch, or a bridge, a macro base station, a micro base station, a relay station, a wireless local area network access point, or the like. The terminal device may be a mobile phone, a tablet computer, a smart home device, an internet of things node, an internet of vehicles device, an augmented reality (augmented reality, AR)/virtual reality (virtual reality, VR) device, or the like.

Figure 7:
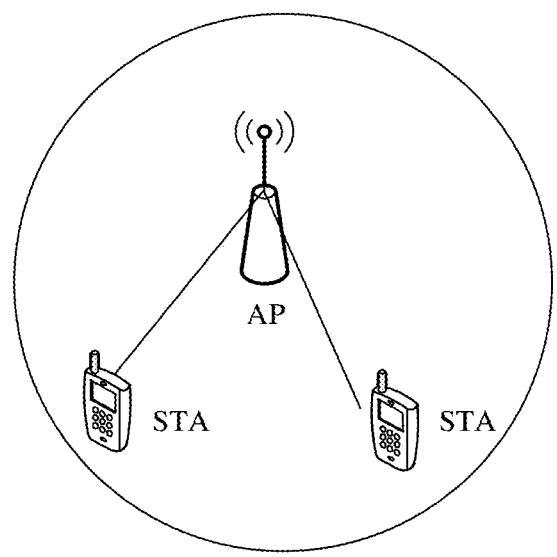
FIG. 7 is a schematic diagram of an architecture of a communications network according to an embodiment of this application.

FIG. 7 shows a wireless local area network communications system applicable to a communication method according to an embodiment of this application. A network device may be an access point (access point, AP) in the wireless local area network communications system. A terminal device may be a station (station, STA) in the wireless local area network communications system. With reference to FIG. 7, a system architecture of the wireless local area network includes at least one AP and at least one station (station, STA). The AP is a network element that provides a service for the station, and may be an access point that supports 802.11 series protocols. The station STA may be a station that supports the 802.11 series protocols. The 802.11 series protocols may include extremely high throughput (extremely high throughput, EHT), or the IEEE 802.11be.

A network architecture and a service scenario that are described in embodiments of this application are intended to describe the technical solutions in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges.

The following describes in detail a communication method provided in embodiments of this application.

Figure 8:
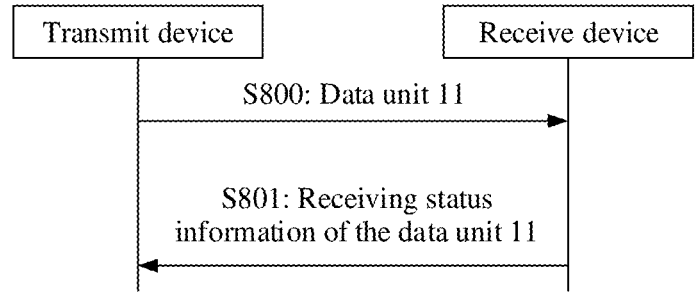
FIG. 8 is a schematic flowchart of a communication method according to an embodiment of this application.

Embodiments of this application provide a first communication method. With reference to FIG. 8, the communication method includes the following steps.

S800: A transmit device sends a data unit 11 to a receive device through a link L11. Correspondingly, the receive device receives the data unit 11 from the transmit device through the link L11.

The data unit 11 may be an MSDU, or may be an A-MSDU. The data unit 11 is carried in a QoS data frame. The QoS data frame corresponds to a TID. Each data unit 11 may correspond to one SN, and different data units 11 transmitted on a same link correspond to different SNs. A corresponding value is set for an acknowledge policy subfield in the QoS data frame in which the data unit 11 is located, to indicate an acknowledge policy corresponding to the data unit 11 in the QoS data frame in which the acknowledge policy subfield is located. If the acknowledge policy subfield of the QoS data frame is set to "10", that is, the acknowledge policy of the data unit 11 in the QoS data frame is no acknowledge, the receive device does not feed back a receiving status of the data unit 11 in the QoS data frame, and S801 does not need to be performed. If the acknowledge policy subfield of the QoS data frame is not set to "10", that is, the acknowledge policy corresponding to the data unit 11 in the QoS data frame is at least one of the following three acknowledge policies: a normal acknowledge or implicit block acknowledge request, no explicit acknowledge or PSMP acknowledge, or a block acknowledge, the receive device performs S801.

S801: The receive device feeds back, to the transmit device through the link L11, receiving status information of the data unit 11 that is received through the link L11, whose acknowledge policy is not set to no acknowledge, and whose SN is greater than or equal to an SSN in a first BA frame. Correspondingly, the transmit device receives the receiving status information of the data unit 11 from the receive device through the link L11.

Herein, in a first possible representation manner, the description of S801 may be replaced as follows: If the data unit 11 meets a first preset condition, the receive device sends the receiving status information of the data unit 11 to the transmit device through the link L11. Correspondingly, the transmit device receives the receiving status information of the data unit 11 from the receive device through the link L11.

The first preset condition at least includes: The acknowledge policy corresponding to the data unit 11 is set to at least one of the normal acknowledge or implicit block acknowledge request, no explicit acknowledge or PSMP acknowledge, or the block acknowledge, and the SN of the data unit 11 is greater than or equal to the SSN in the first BA frame.

Herein, in a second possible representation manner, the description of S801 may be replaced as follows: If the data unit 11 meets a second preset condition, the receive device sends the receiving status information of the data unit 11 to the transmit device through the link L11. Correspondingly, the transmit device receives the receiving status information of the data unit 11 from the receive device through the link L11.

The second preset condition at least includes: The acknowledge policy corresponding to the data unit 11 is not set to no acknowledge, and the SN of the data unit 11 is greater than or equal to the SSN in the first BA frame.

Herein, in the foregoing three possible representations, the receiving status information of the data unit 11 is carried in the first BA frame. The SSN in the first BA frame is determined based on an SSN in a BAR frame. There are specifically the following two examples.

Example 1: if the acknowledge policy is the normal acknowledge or implicit block acknowledge request, the receive device uses an SSN in a BAR frame most recently received as the SSN in the first BA frame in S801. Herein, the "BAR frame most recently received" refers to a BAR frame last received before the receive device performs S800. For example, before performing S800, the receive device receives the QoS data frame whose acknowledge policy is the block acknowledge, and also receives a corresponding BAR frame. In this case, the receive device uses the SSN in the BAR frame most recently received as the SSN in the first BA frame in S801. For another example, before performing S800, the receive device does not receive the QoS data frame whose acknowledge policy is the block acknowledge, and therefore cannot receive a corresponding BAR frame in a scenario in which the acknowledge policy is the block acknowledge. In this case, the "BAR frame most recently received" is an add block acknowledge (add block acknowledge, ADDBA) request (request) frame received in a process of establishing a link between the transmit device and the receive device.

Example 2: if the acknowledge policy is the block acknowledge, after performing S800, the transmit device further sends a BAR frame to the receive device through the link L11. Correspondingly, after performing S800, the receive device further receives the BAR frame from the transmit device through the link L11. Herein, the receive device uses an SSN in the BAR frame received this time as the SSN in the first BA frame in S801. Alternatively, if the acknowledge policy is the block acknowledge, after performing S800, the transmit device does not explicitly send the BAR frame to the receive device through the link L11, but sends a next QoS data frame that carries a data unit to the receiving end device through the link L11. In addition, a value of an acknowledge policy subfield corresponding to the next QoS data frame that carries the data unit is "00". That is, the acknowledge policy corresponding to the data unit in the next QoS data frame is the normal acknowledge or implicit block acknowledge request. In this case, the transmit device sends an implicit BAR frame to the receive device. The receive device uses an SSN in a BAR frame most recently received as the SSN in the first BA frame in S801. For details, refer to related descriptions in Example 1. Details are not described herein again.

The data unit 11 that feeds back the receiving status to the transmit device through the link L11 may be, for example, but is not limited to, the following two cases.

Case 1: A receiving link is the link L11. The acknowledge policy is the normal acknowledge or implicit block acknowledge request, and the SN of the data unit 11 is greater than or equal to the SSN in the first BA frame. Herein, it can be learned from the acknowledge manner of the SSN in the first BA frame in the example 1 that, the data unit 11 whose acknowledge policy is the normal acknowledge or implicit block acknowledge request meets the requirement for the SN.

Case 2: The receiving link is the link L11. The acknowledge policy is the block acknowledge, and the SN of the data unit 11 is greater than or equal to the SSN in the first BA frame. Herein, it can be learned from the acknowledge manner of the SSN in the first BA frame in the example 2 that, the data unit 11 whose acknowledge policy is the block acknowledge meets the requirement for the SN.

For example, with reference to FIG. 3, each acknowledge policy of a QoS data frame transmitted in FIG. 3 is the block acknowledge, and each BAR frame is transmitted through a link La. The receive device uses a BA frame to feed back a receiving status of the QoS data frame. For example, the receive device sends a BA 1 frame. An A-MPDU 1 is received through the link La. The acknowledge policy is not set to no acknowledge, and an SN of each MSDU in the A-MPDU 1 is greater than or equal to an SSN (SSN=1) in the BA 1 frame. An A-MPDU 3 is received through a link Lb, not through the link La. A BAR 1 frame includes receiving status information of the A-MPDU 1 transmitted through the link La, and may not include receiving status information of the A-MPDU 3 transmitted through the link Lb. In addition, the receiving status information of the A-MPDU 3 does not need to be fed back through the link Lb. Based on a same reason, in a scenario shown in FIG. 5, a BA 1 frame includes receiving status information of an A-MPDU 1 transmitted through a link Lc, and may not include receiving status information of an A-MPDU 3 transmitted through a link Ld. In addition, the receiving status information of the A-MPDU 3 does not need to be fed back through the link Ld.

It should be noted that the acknowledge policy of each data unit 11 is indicated by the acknowledge policy subfield in the QoS data frame in which the data unit 11 is located. For a data unit 11 corresponding to a same SN, if the transmit device retransmits the data unit 11 corresponding to the SN, the data unit 11 corresponding to the SN may correspond to two acknowledge policies. For example, if the data unit 11 corresponding to the SN is transmitted for the first time, an acknowledge policy subfield in a QoS data frame in which the data unit 11 corresponding to the SN is located indicates that the acknowledge policy is the normal acknowledge or implicit block acknowledge request. In this case, the receive device feeds back a receiving status in a manner of the "normal acknowledge or implicit block acknowledge request". If the data unit 11 corresponding to the SN is retransmitted, the acknowledge policy subfield in the QoS data frame in which the data unit 11 corresponding to the SN is located indicates that the acknowledge policy is the block acknowledge. In this case, the receive device feeds back the receiving status in a manner of the "block acknowledge".

According to the communication method provided in this embodiment of this application, when the receive device feeds back the first BA frame, for a data unit that is received on a link, whose acknowledge policy is not set to no acknowledge, and whose SN is greater than or equal to the SSN in the first BA frame, a receiving status of the data unit needs to be fed back to the transmit device through the link. This can avoid a phenomenon that some scenarios in the related technology violate an acknowledge rule that "a receiving status of a data unit received on a link needs to be fed back through the link".

Figure 9:
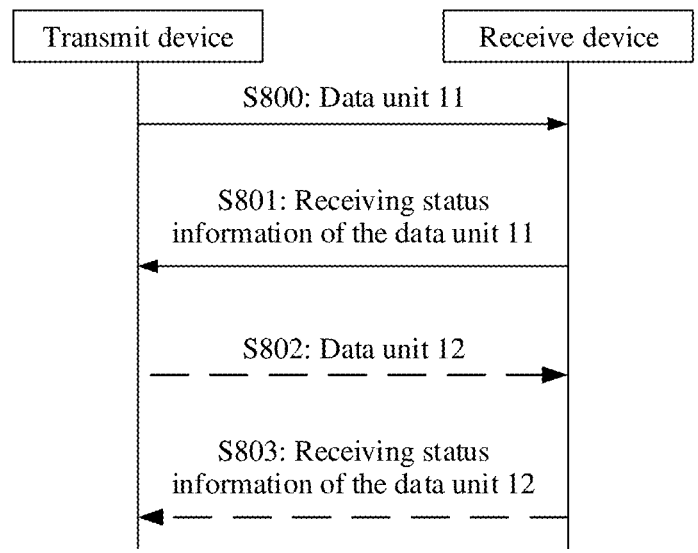
FIG. 9 is a schematic flowchart of another communication method according to an embodiment of this application.

In some embodiments, according to the communication method in this embodiment of this application, a receiving status of a data unit received on another link can be further fed back through the link (the link L11). With reference to FIG. 9, this embodiment of this application further includes S802 and S803.

S802: The transmit device sends a data unit 12 to the receive device through a link L12. Correspondingly, the receive device receives the data unit 12 from the transmit device through the link L12.

The data unit 12 may be an MSDU, or may be an A-MSDU. The link L12 is a link in other links different from the link L11 between the transmit device and the receive device.

S803: The receive device feeds back, to the transmit device through the link L11, receiving status information of the data unit 12 that is received through the link L12, whose acknowledge policy is not set to no acknowledge, and whose SN is greater than or equal to the SSN in the first BA frame. Correspondingly, the transmit device receives the receiving status information of the data unit 12 from the receive device through the link L11.

The first BA frame is the first BA frame returned in S801.

For example, with reference to FIG. 3, an A-MPDU 3 is received through a link Lb. An acknowledge policy is the block acknowledge, and an SN of each MSDU in the A-MPDU 3 is greater than an SSN in a BA 1 frame. The BA 1 frame transmitted through a link La may also include receiving status information of the A-MPDU 3 transmitted through the link Lb. Similarly, in a scenario shown in FIG. 6, an A-MPDU 3 is received through a link Ld. An acknowledge policy is the block acknowledge, and an SN of each MSDU in the A-MPDU 3 is greater than an SSN in a BA 1 frame. The BA 1 frame transmitted through a link Lc may also include receiving status information of the A-MPDU 3 transmitted through the link Ld.

In this way, the receiving status of the data unit that is received on the another link, whose acknowledge policy is not set to no acknowledge, and whose SN is greater than or equal to the SSN in the first BA frame transmitted on the link (that is, the link L11) may also be carried in the first BA frame, and be fed back to the transmit device through the link (that is, the link L11), so that the transmit device obtains the receiving status of the data unit transmitted on the another link in time.

In some embodiments, the receiving status that is of the data unit 11 and that is fed back on the link (the link L11) may also be fed back on the another link. The receive device not only feeds back the receiving status of the data unit 11 that meets the first preset condition to the transmit device through the link (the link L11), but also may feed back the receiving status of the data unit 11 that meets the first preset condition to the transmit device through another available link. In this way, the receive device may feed back the receiving status of the data unit 11 that meets the first preset condition to the transmit device through a plurality of links, so that the transmit device obtains the receiving status of the corresponding data unit 11 in time.

Figure 10:
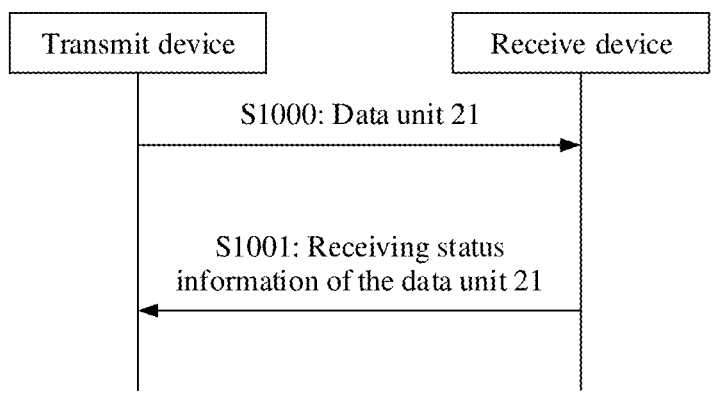
FIG. 10 is a schematic flowchart of still another communication method according to an embodiment of this application.

Embodiments of this application provide a second communication method. With reference to FIG. 10, the communication method includes the following steps.

S1000: A transmit device sends a data unit 21 to a receive device through a link L21. Correspondingly, the receive device receives the data unit 21 from the transmit device through the link L21.

The data unit 21 may be an MSDU, or may be an A-MSDU. The data unit 21 is carried in a QoS data frame. Each data unit 21 may correspond to one SN, and different data units 21 transmitted on a same link correspond to different SNs. A corresponding value is set for an acknowledge policy subfield in the QoS data frame, to indicate an acknowledge policy corresponding to the data unit 21 in the QoS data frame in which the acknowledge policy subfield is located. If the acknowledge policy subfield of the QoS data frame in which the data unit 21 is located is set to "10", that is, the acknowledge policy of the QoS data frame is no acknowledge, the receive device does not need to feed back a receiving status of the data unit 21 in the QoS data frame to the transmit device, and S1001 does not need to be performed. If the acknowledge policy subfield of the QoS data frame in which the data unit 21 is located is not set to "10", that is, the acknowledge policy corresponding to the data unit 21 in the QoS data frame is at least one of the following three acknowledge policies: a normal acknowledge or implicit block acknowledge request, no explicit acknowledge or PSMP acknowledge, or a block acknowledge, the receive device performs S1001.

S1001: If an SN of the data unit 21 falls within a bitmap range of a scoreboard (scoreboard), the receive device sends receiving status information of the data unit 21 to the transmit device through the link L21. Correspondingly, the transmit device receives the receiving status information of the data unit 21 from the receive device through the link L21.

The receiving status information of the data unit 21 is carried in a second BA frame. Herein, there are the following two scenarios in which the receive device determines to send the second BA frame: An acknowledge policy corresponding to an MPDU received through the link L21 is a normal acknowledge or implicit block acknowledge request, and the MPDU is an A-MPDU; the acknowledge policy corresponding to the MPDU received through the link L21 is a block acknowledge.

Each link corresponds to one scoreboard. The scoreboard in S1001 refers to the scoreboard corresponding to the link L21. There may be, for example, but is not limited to, the following two manners for moving the bitmap range of the scoreboard.

Manner 1: Move the bitmap range of the scoreboard based on an SSN in a BAR frame. For example, after receiving the BAR frame, the receive device uses the SSN in the BAR frame as a first end value of the bitmap range of the scoreboard, and uses a sum of the SSN in the BAR frame and a preset value as a second end value of the bitmap range of the scoreboard. The preset value is a quantity of bits in the bitmap of the scoreboard.

Manner 2: Move the bitmap range of the scoreboard based on a maximum value of an SN of a data unit (an MSDU or an A-MSDU) whose receiving status needs to be fed back. For example, the receive device receives two QoS data frames. A value of a data unit in one QoS data frame ranges from 21 to 30, and a value of a data unit in the other QoS data frame is 85. The bitmap of the scoreboard includes 64 bits. Even if a value of the SSN in the BAR frame is 21, and the bitmap range of the scoreboard determined by the receive device is 21 to 84, the receiving status of the data unit whose SN is 85 cannot be recorded. In this case, the receive device updates the bitmap range of the scoreboard to 22 to 85, to record a receiving status of a data unit whose SN has a value range of 22 to 85. In addition, if the receive device does not correctly receive the data unit whose SN is 85, the receive device maintains the bitmap range of the scoreboard as 21 to 84. In this way, the receive device does not feed back the receiving status of the data unit 21 whose SN is 85 to the transmit device. In this case, the transmit device learns that the data unit 21 whose SN is 85 is not received correctly.

For example, with reference to FIG. 3, each acknowledge policy of a QoS data frame transmitted in FIG. 3 is the block acknowledge. The receive device uses a BA frame to feed back a receiving status of an MSDU in the QoS data frame. Therefore, when the receive device feeds back a BA 1 frame through a link La, the BA 1 frame includes receiving status information of an MSDU that is received through the link La and whose SN falls within a bitmap range of a scoreboard. If a link Lb does not transmit a BAR frame, the receive device does not feed back the BA frame on the link Lb. Therefore, receiving statuses of MSDUs whose SN values range from 1 to 10 are fed back through the link La, and receiving statuses of MSDUs whose SN values range from 11 to 20 are not fed back through the link Lb. Based on a same reason, in a scenario shown in FIG. 6, each BAR frame is transmitted through a link Lc. Therefore, when the receive device feeds back the BA 1 frame through the link Lc, and the BA 1 frame includes a receiving status of an MSDU that is received through the link Lc and whose SN falls within a bitmap range of a scoreboard. If a link Ld does not transmit the BAR frame, the receive device does not feed back a BA frame on the link Ld. Therefore, receiving statuses of MSDUs whose SN values range from 1 to 10 are fed back through the link Lc, but not through the link Ld.

According to the communication method provided in this embodiment of this application, when the receive device sends the second BA frame on a link, for a data unit corresponding to a bit of the SN in the bitmap of the scoreboard, if the data unit is received on the link, a receiving status of the data unit needs to be indicated by using the second BA frame. This can expand applicable scenarios are expanded, and avoid a phenomenon that some scenarios violate the acknowledge rule that "a receiving status of a data unit received on a link needs to be fed back through the link".

Figure 11:
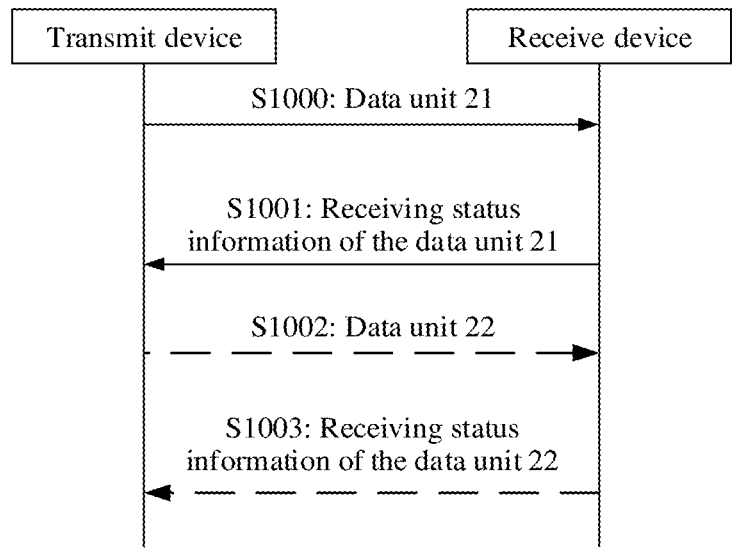
FIG. 11 is a schematic flowchart of still another communication method according to an embodiment of this application.

In some embodiments, according to the communication method in this embodiment of this application, a receiving status of a data unit received on another link can be further fed back through the link (the link L21). With reference to FIG. 11, this embodiment of this application further includes S1002 and S1003.

S1002: The transmit device sends a data unit 22 to the receive device through a link L22. Correspondingly, the receive device receives the data unit 22 from the transmit device through the link L22.

The data unit 22 may be an MSDU or an A-MSDU. The data unit 22 is carried in a QoS data frame. The link L22 is a link in other links different from the link L21 between the transmit device and the receive device.

S1003: If an SN of the data unit 22 falls within the bitmap range of the scoreboard corresponding to the link L21, the receive device sends receiving status information of the data unit 22 to the transmit device through the link L21. Correspondingly, the transmit device receives the receiving status information of the data unit 22 from the receive device through the link L21.

The receiving status information of the data unit 22 and the receiving status information of the data unit 21 may be carried in a same second BA frame, or may be carried in different second BA frames.

For example, with reference to FIG. 3, an A-MPDU 3 is received through a link Lb, but a value of an SN of an MSDU in the A-MPDU 3 falls within a bitmap range of a scoreboard on a link La. In this case, a receiving status of the MSDU in the A-MPDU 3 may also be transmitted through the link La. Similarly, in a scenario shown in FIG. 6, an A-MPDU 3 is received through a link Ld, but a value of an SN of an MSDU in the A-MPDU 3 falls within a bitmap range of a scoreboard on a link Lc. In this case, a receiving status of the MSDU in the A-MPDU 3 may also be transmitted through the link Lc.

In this way, a receiving status of a data unit that is received through another link and whose SN falls within the bitmap range of the scoreboard of the link L21 may also be transmitted through the link L21, so that the transmit device obtains, in time, the receiving status of the data unit transmitted through the another link. This can expand application scenarios are expanded, and avoid the phenomenon that some scenarios violate the acknowledge rule that "a receiving status of a data unit received on a link needs to be fed back through the link".

In some embodiments, the receive device not only feeds back the receiving status of the data unit 21 to the transmit device through the link (the link L21), but also may feed back the receiving status of the data unit 21 to the transmit device through another available link. Herein, the another available link may be any other link different from the link L21 between the transmit device and the receive device. In this way, the receive device may feed back the receiving status of the data unit 21 to the transmit device through a plurality of links, so that the transmit device obtains the receiving status of the data unit 21 in time.

Figure 12:
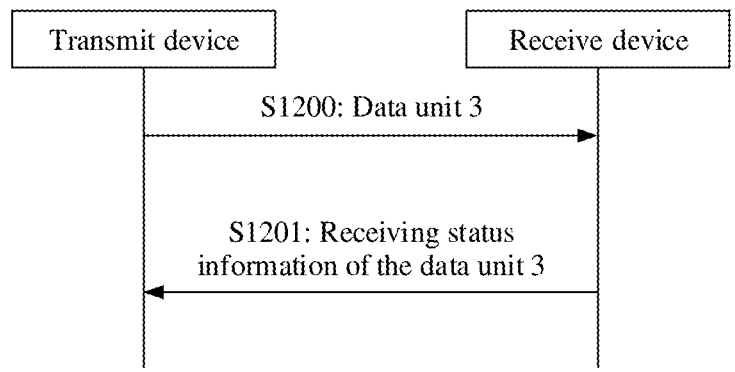
FIG. 12 is a schematic flowchart of still another communication method according to an embodiment of this application.

Embodiments of this application provide a third communication method. With reference to FIG. 12, the communication method includes the following steps.

S1200: A transmit device sends a data unit 3 to a receive device through a link L31. Correspondingly, the receive device receives the data unit 3 from the transmit device through the link L31.

The data unit 3 may be an MSDU, or may be an A-MSDU. The data unit 3 is carried in a QoS data frame. Each data unit 3 may correspond to one SN, and different data units 3 transmitted on a same link correspond to different SNs. A corresponding value is set for an acknowledge policy subfield in the QoS data frame, to indicate an acknowledge policy corresponding to the data unit 3 in the QoS data frame in which the acknowledge policy subfield is located.

S1201: The receive device sends receiving status information of the data unit 3 to the transmit device through the link L31, unless the data unit 3 meets any one of a third preset condition. Correspondingly, the transmit device receives the receiving status information of the data unit 3 from the receive device through the link L31.

The third preset condition includes at least one of the following:

Correctly received information of the data unit 3 is fed back through another link, and the acknowledge policy corresponding to the data unit 3 is no acknowledge.

Herein, that "correctly received information of the data unit 3 is fed back through another link" means that the information of "the receive device has correctly received the data unit 3" is fed back through the another link. The another link may be other available links different from the link L31 between the receive device and the transmit device.

Herein, the third preset condition may also be expressed as:

The receiving status information of the data unit 3 is fed back through the another link, and a corresponding bit in a BA frame is set to 1;

and the acknowledge policy corresponding to the data unit 3 is no acknowledge.

In another expression of the third preset condition, the "BA frame" is a BA frame that carries the receiving status information of the data unit 3. That "a corresponding bit is set to 1" indicates that the receive device correctly receives an MSDU corresponding to the bit.

For example, if the acknowledge policy of the data unit 3 is a normal acknowledge or implicit block acknowledge request, there is no phenomenon that correct reception of the data unit 3 is fed back through the another link. In this way, a receiving status of the data unit 3 is definitely fed back on the link for receiving the data unit 3. For details, refer to the conventional art. Details are not described herein again.

When the acknowledge policy of the data unit 3 is no acknowledge, the receiving status of the data unit 3 does not need to be fed back through the link L31 or the another link.

If the acknowledge policy of the data unit 3 is a block acknowledge, if the correctly received information of the data unit 3 is fed back through the another link, the receiving status of the data unit 3 does not need to be fed back through the link L31. If the correctly received information of the data unit 3 is not fed back through the another link, the receive device feeds back the receiving status of the data unit 11 based on the related description about the block acknowledge in the first communication method in embodiments of this application, or feeds back the receiving status of the data unit 21 based on the related description about the block acknowledge in the second communication method. Details are not described herein again.

For example, with reference to FIG. 3, each acknowledge policy of a QoS data frame transmitted in FIG. 3 is the block acknowledge. The receive device transmits a BA 1 frame through a link La, and the BA 1 frame includes receiving statuses of MSDUs whose SN values range from 11 to 20. Therefore, the receive device does not need to feed back the receiving statuses of the MSDUs whose SN values range from 11 to 20 through a link Lb. Based on a same reason, in a scenario shown in FIG. 6, the receive device transmits a BA 1 frame through a link Lc, and the BA 1 frame includes receiving statuses of MSDUs whose SN values range from 1 to 10. Therefore, the receive device does not need to feed back the receiving statuses of the MSDUs whose SN values range from 1 to 10 through a link Ld.

According to the communication method provided in this embodiment of this application, if the correctly received information of the data unit 3 is fed back through the another link, or the acknowledge policy of the data unit 3 is no acknowledge, the receive device does not need to feed back the receiving status of the data unit 3 on the link for receiving the data unit 3. In addition to the foregoing two cases, the receive device needs to feed back the receiving status of the data unit 3 on the link for receiving the data unit 3. This can adapt to scenarios in different acknowledge policies, and avoid a phenomenon that some scenarios violate an acknowledge rule that "a receiving status of a data unit received on a link needs to be fed back through the link".

In some embodiments, when the acknowledge policy of the data unit 3 is not set to no acknowledge, the receive device feeds back the receiving status information of the data unit 3 to the transmit device through another available link (for example, a link L32). Herein, the another available link may be any other link different from the link L31 between the transmit device and the receive device.

The data unit 3 that feeds back the receiving status to the transmit device through the link L32 may be, for example, but is not limited to, the following two cases.

Case 1: The acknowledge policy corresponding to the data unit 3 is the block acknowledge, and an SN of the data unit 3 is greater than or equal to an SSN in the BA frame that is used to carry the receiving status information of the data unit 3.

Case 2: The acknowledge policy corresponding to the data unit 3 is the block acknowledge, and an SN of the data unit 3 falls within a bitmap range of a scoreboard corresponding to the link 31.

For example, with reference to FIG. 3, each acknowledge policy of a QoS data frame transmitted in FIG. 3 is the block acknowledge, and each BAR frame is transmitted through a link La. The receive device uses a BA frame to feed back a receiving status of the QoS data frame. For example, the receive device sends a BA 1 frame. An A-MPDU 3 is received through a link Lb, not through the link La. Receiving status information of the A-MPDU 3 is carried in the BA 1 frame, and is fed back through the link La. Based on a same reason, in a scenario shown in FIG. 6, an A-MPDU 3 is received through a link Ld, not through a link Lc. Receiving status information of the A-MPDU 3 is carried in a BA 1 frame and is fed back through the link Lc.

In this way, when the acknowledge policy is not set to no acknowledge, a receiving status of a data unit received on a link can be fed back through another link. This can avoid the phenomenon that some scenarios violate the acknowledge rule that "a receiving status of a data unit received on a link needs to be fed back through the link".

Figure 13:
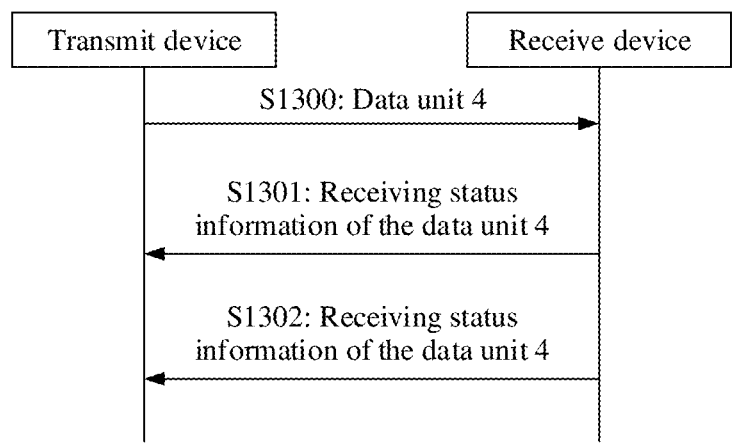
FIG. 13 is a schematic flowchart of still another communication method according to an embodiment of this application.

Embodiments of this application provide a fourth communication method. With reference to FIG. 13, the communication method includes the following steps.

S1300: A transmit device sends a data unit 4 to a receive device through a link L41. Correspondingly, the receive device receives the data unit 4 from the transmit device through the link L41.

The data unit 4 may be an MSDU, or may be an A-MSDU. A QoS data frame in which the data unit 4 is located corresponds to a TID. The QoS data frame includes one or more data units 4. Each data unit 4 may correspond to one SN, and different data units transmitted on a same link correspond to different SNs. A corresponding value is set for an acknowledge policy subfield in the QoS data frame, to indicate an acknowledge policy corresponding to the data unit in the QoS data frame in which the acknowledge policy subfield is located. If a value of the acknowledge policy subfield of the QoS data frame is "00", that is, an acknowledge policy of the QoS data frame is a normal acknowledge or implicit block acknowledge request, the receive device performs S1301. If a value of the acknowledge policy subfield of the QoS data frame is "10", that is, the acknowledge policy of the QoS data frame is no acknowledge, the receive device does not need to feed back a receiving status of the QoS data frame. If a value of the acknowledge policy subfield of the QoS data frame is "11", that is, the acknowledge policy of the QoS data frame is a block acknowledge, the receive device performs S1302. Related descriptions of S1301 and S1302 are as follows.

S1301: If the acknowledge policy of the data unit 4 is the normal acknowledge or implicit block acknowledge request, the receive device sends receiving status information of the data unit 4 to the transmit device through a link L41. Correspondingly, the transmit device receives the receiving status information of the data unit 4 from the receive device through the link L41.

That is, if the acknowledge policy is the normal acknowledge or implicit block acknowledge request, a receiving status of the data unit 4 received on a link is fed back through the link, and there is no phenomenon that the receiving status of the data unit 4 is not fed back through the link. This is applicable to an acknowledge rule in a related technology.

S1302: If the acknowledge policy of the data unit 4 is the block acknowledge, and an SN is greater than or equal to an SSN in a third BA frame, the receive device sends the receiving status information of the data unit 4 to the transmit device through the link L41. Correspondingly, the transmit device receives the receiving status information of the data unit 4 from the receive device through the link L41.

The receiving status information of the data unit 4 is carried in the third BA frame. For a manner of determining the SSN in the third BA frame, refer to related descriptions in S801. Details are not described herein again.

For example, in a scenario shown in FIG. 3, the acknowledge policy is the block acknowledge, and each BAR frame is transmitted through a link La. The receive device uses a BA frame to feed back the receiving status of the QoS data frame. For example, the receive device sends a BA 1 frame. An A-MPDU 1 is received through the link La, and an SN of each MSDU in the A-MPDU 1 is greater than or equal to an SSN (SSN=1) in the BA 1 frame. Therefore, the BA 1 frame includes a receiving status of the A-MPDU 1 transmitted through the link La. An A-MPDU 3 is received through a link Lb. The BA 1 frame may not include a receiving status of the A-MPDU 3 transmitted through the link Lb. Based on a same reason, in a scenario shown in FIG. 6, the acknowledge policy is the block acknowledge, and each BAR frame is transmitted through a link Lc. For example, the receive device sends a BA 1 frame. An A-MPDU 1 is received through the link Lc, and an SN of each MSDU in the A-MPDU 1 is greater than or equal to an SSN (SSN=1) in the BA 1 frame. Therefore, the BA 1 frame includes a receiving status of the A-MPDU 1 transmitted through the link Lc. An A-MPDU 3 is received through a link Ld. The BA 1 frame may not include a receiving status of the A-MPDU 3 transmitted through the link Ld.

It should be noted that data units with different acknowledge policies may be transmitted on one link. For example, on a link, a data unit whose acknowledge policy is the block acknowledge may be first transmitted, and then a data unit whose acknowledge policy is the normal acknowledge or implicit block acknowledge request is transmitted. The receive device may feed back a receiving status based on the acknowledge policy corresponding to each data unit. That is, after performing S1302, the transmit device may further perform S1300, and the acknowledge policy of the data unit is set to the normal acknowledge or implicit block acknowledge request.

In some embodiments, the receive device not only feeds back the receiving status of the data unit 4 to the transmit device through the link (the link L41), but also may feed back the receiving status of the data unit 4 to the transmit device through another available link. Herein, the another available link may be any other link different from the link L41 between the transmit device and the receive device. In this way, the receive device may feed back the receiving status of the data unit 4 to the transmit device through a plurality of links, so that the transmit device obtains the receiving status of the data unit 4 in time.

It should be noted that in embodiments of this application, a data unit is used as an example to describe an implementation process of the communication method in embodiments of this application. The data unit may be an MSDU, or may be an A-MSDU.

The foregoing mainly describes the solutions provided in embodiments of this application from a perspective of interaction between the network elements. It may be understood that, to implement the foregoing functions, the transmit device and the receive device include corresponding hardware structures and/or software modules for performing the functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
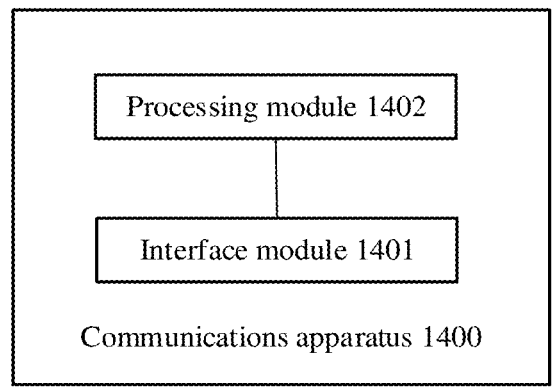
FIG. 14 is a schematic diagram of a composition of a communications apparatus according to an embodiment of this application.

FIG. 14 is a schematic diagram of a structure of a communications apparatus 1400. The communications apparatus 1400 includes an interface module 1401 and a processing module 1402. The interface module 1401 is an interface circuit of the apparatus, and is configured to receive a signal from or send a signal to another apparatus. For example, when the apparatus is implemented in a form of a chip, the interface module 1401 is an interface circuit that is of the chip and that is configured to receive a signal from another chip or apparatus. Alternatively, the interface module 1401 is an interface circuit that is of the chip and that is configured to send a signal to another chip or apparatus.

For example, the communications apparatus 1400 is the receive device in the foregoing method embodiments.

The receive device in FIG. 8 is used as an example. The interface module 1401 is configured to receive a data unit from a transmit device through a link. The processing module 1402 is configured to determine that the data unit meets a preset condition. The interface module 1401 is further configured to send receiving status information of the data unit to the transmit device through the link. The preset condition includes: An acknowledge policy corresponding to the data unit is not set to no acknowledge, and a sequence number SN of the data unit is greater than or equal to a start sequence number SSN in a block acknowledge BA frame. The receiving status information of the data unit is carried in the BA frame.

The receive device in FIG. 10 is used as an example. The interface module 1401 is configured to receive a data unit from a transmit device through a link. The processing module 1402 is configured to determine that a sequence number SN of the data unit falls within a bitmap range of a scoreboard. The interface module 1401 is further configured to send receiving status information of the data unit to the transmit device through the link. The scoreboard corresponds to the link, and the receiving status information of the data unit is carried in a block acknowledge BA frame.

The receive device in FIG. 12 is used as an example. The interface module 1401 is configured to receive a first data unit from a transmit device through a first link. The interface module 1401 is further configured to send receiving status information of the first data unit to the transmit device through the first link, unless the processing module 1402 determines that the first data unit meets any one of a first preset condition. The processing module 1402 is configured to determine that the first data unit meets any one of the first preset condition. The first preset condition includes: Correctly received information of the first data unit is fed back through another link, or an acknowledge policy corresponding to the first data unit is no acknowledge.

In a possible design, the processing module 1402 is configured to determine that the acknowledge policy of the first data unit is not set to no acknowledge. The interface module 1401 is further configured to send receiving status information of the first data unit to the transmit device through a second link.

In a possible design, the processing module 1402 is configured to determine that the acknowledge policy of the first data unit is a block acknowledge, and a sequence number SN of the first data unit is greater than or equal to a start sequence number SSN in a first block acknowledge BA frame. The interface module 1401 is further configured to: when the processing module 1402 determines that the acknowledge policy of the first data unit is the block acknowledge, and the SN of the first data unit is greater than or equal to the SSN in the first BA frame, send the receiving status information of the first data unit to the transmit device through the first link. The receiving status information of the first data unit is carried in the first BA frame.

In a possible design, the processing module 1402 is configured to determine that the acknowledge policy of the first data unit is the block acknowledge, and the SN of the first data unit falls within a bitmap range of a first scoreboard. The interface module 1401 is further configured to: when the processing module 1402 determines that the acknowledge policy of the first data unit is the block acknowledge, and the SN of the first data unit falls within the bitmap range of the first scoreboard, send the receiving status information of the first data unit to the transmit device through the first link. The first scoreboard corresponds to the first link, and the receiving status information of the first data unit is carried in a second BA frame.

The receive device in FIG. 13 is used as an example. The interface module 1401 is configured to receive a first data unit from a transmit device through a first link. The processing module 1402 is configured to determine that an acknowledge policy of the first data unit is a normal acknowledge or implicit block acknowledge request. The interface module 1401 is further configured to: when the processing module 1402 determines that the acknowledge policy of the first data unit is the normal acknowledge or implicit block acknowledge request, send receiving status information of the first data unit to the transmit device through the first link.

In a possible design, the interface module 1401 is configured to receive a second data unit from the transmit device through a second link. The processing module 1402 is configured to determine that an acknowledge policy of the second data unit is a block acknowledge, and a sequence number SN of the second data unit is greater than or equal to a start sequence number SSN in a first block acknowledge BA frame. The interface module 1401 is further configured to: when the processing module 1402 determines that the acknowledge policy of the second data unit is the block acknowledge, and the SN of the second data unit is greater than or equal to the SSN in the first BA frame, send receiving status information of the second data unit to the transmit device through the second link. The receiving status information of the second data unit is carried in the first BA frame.

All related content of the steps in the foregoing method embodiments may be cited in function descriptions of a corresponding functional module. Details are not described herein again.

In this embodiment, the communications apparatus 1400 is presented in a form of functional modules obtained through division in an integrated manner. The "module" herein may be a specific ASIC, a circuit, a processor that executes one or more software or firmware programs, a memory, an integrated logic circuit, and/or another device that can provide the foregoing function. In a simple embodiment, a person skilled in the art may figure out that the communications apparatus 1400 may be in a form of a communications apparatus 1500 shown in FIG. 15.

Figure 15:
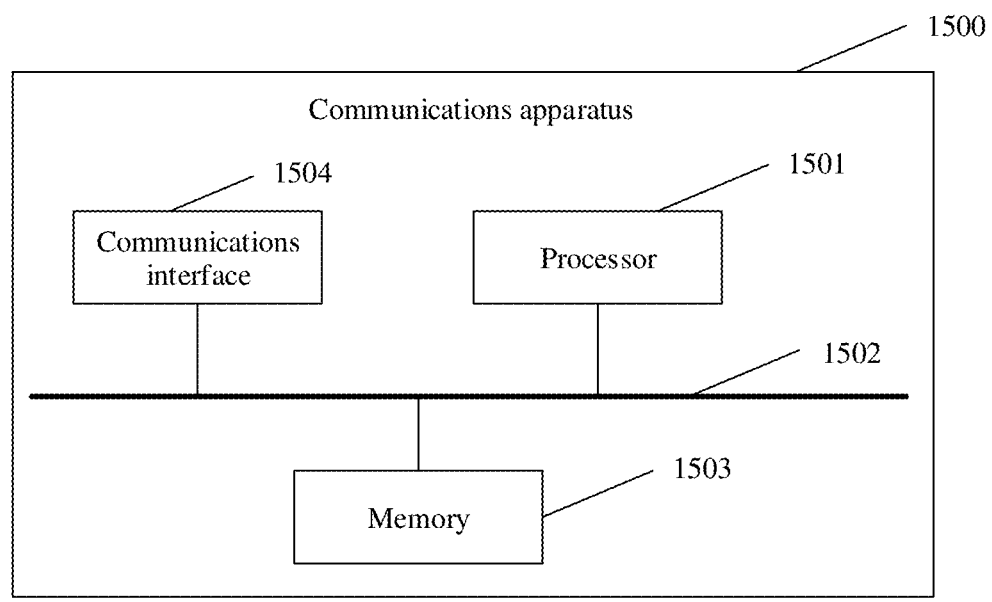
FIG. 15 is a schematic diagram of a structure of hardware of a communications apparatus according to an embodiment of this application.

For example, a processor 1501 in the communications apparatus 1500 shown in FIG. 15 may invoke computer-executable instructions stored in a memory 1503, so that the communications apparatus 1500 performs the communication method in the foregoing method embodiments.

Specifically, functions/implementation processes of the interface module 1401 and the processing module 1402 in FIG. 14 may be implemented by the processor 1501 in the communications apparatus 1500 shown in FIG. 15 by invoking the computer-executable instructions stored in the memory 1503. Alternatively, the function/implementation process of the processing module 1402 in FIG. 14 may be implemented by the processor 1501 in the communications apparatus 1500 shown in FIG. 15 by invoking the computer-executable instructions stored in the memory 1503, and the function/implementation process of the interface module 1401 in FIG. 14 may be implemented by using a communications interface 1504 in the communications apparatus 1500 shown in FIG. 15. The processor 1501, the memory 1503, and the communications interface 1504 are connected through a bus 1502.

The communications apparatus provided in this embodiment may perform the foregoing communication method. Therefore, for technical effects that can be achieved by the communications apparatus, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built in a system on chip (system on chip, SoC) or an application-specific integrated circuit (application specific integrated circuit, ASIC), or may be an independent semiconductor chip. In addition to a core for executing software instructions to perform operations or processing, the processor may further include a necessary hardware accelerator, for example, a field programmable gate array (field programmable gate array, FPGA), a programmable logic device (programmable logic device, PLD), or a logic circuit that implements a dedicated logic operation.

When the foregoing modules or units are implemented by using hardware, the hardware may be any one of or any combination of a CPU, a microprocessor, a digital signal processing (digital signal processing, DSP) chip, a microcontroller unit (microcontroller unit, MCU), an artificial intelligence processor, an ASIC, or an SoC, an FPGA, a PLD, a dedicated digital circuit, a hardware accelerator, or a non-integrated discrete device, and may run necessary software or not depend on software to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store necessary program instructions and data. The processor may invoke program code stored in the memory to instruct the communications apparatus to perform the method in any one of the foregoing method embodiments. Certainly, the memory may not be in the communications apparatus. When the communications apparatus is a chip system, the communications apparatus may include a chip, or may include a chip and another discrete component. This is not specifically limited in this embodiment of this application.

All or a part of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk drive, or a magnetic tape), an optical medium (for example, a digital video disc (digital video disc/disk, DVD)), a semiconductor medium (for example, a solid-state disk (solid state disk, SSD)), or the like.

In the foregoing embodiments of this application, "a plurality of" means two or more. The term "and/or" describes an association relationship between associated objects and indicates that three relationships may exist. For example, A and/or B may indicate the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one (at least one of) . . ." means one or any combination of subsequent associated objects. For example, "at least one of A, B, and C" includes A, B, C, AB, AC, BC, or ABC. Determining Y based on X does not mean that Y is determined based on only X, and Y may be further determined based on X and other information.

Although this application is described with reference to the embodiments, in a process of implementing this application that claims protection, a person skilled in the art may understand and implement other variations of the disclosed embodiments by viewing the accompanying drawings, disclosed content, and appended claims. In the claims, the term "comprise" (comprising) does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

The invention claimed is:

1. A communication method, comprising:
   receiving, by a receiver, a data unit from a transmitter through a link; and
   sending, by the receiver, receiving status information of the data unit to the transmitter through the link in response to the data unit satisfying a preset link condition, wherein the preset link condition comprises:
   a link acknowledgement policy corresponding to the data unit in the link failing to be set to no acknowledgement, and a sequence number (SN) of the data unit in the link is greater than or equal to a start sequence number (SSN) in a block acknowledge (BA) frame for the link; and the receiving status information of the data unit in the link is included in the BA frame.

2. The communication method according to claim 1, wherein the data unit is a medium access control service data unit (MSDU) or an aggregated medium access control service data unit (A-MSDU).

3. The communication method according to claim 1, wherein the link acknowledgement policy corresponding to the data unit is set to at least one of a normal acknowledge or implicit block acknowledge request.

4. A communication method, comprising:
   receiving, by a receiver, a data unit from a transmitter through a first link; and
   sending, by the receiver, receiving status information of the data unit to the transmitter through a second link in response to a sequence number (SN) of the data unit being within a bitmap range of a scoreboard of the second link, wherein
   the scoreboard corresponds to the second link, and the receiving status information of the data unit is included in a block acknowledge (BA) frame.

5. The communication method according to claim 4, wherein the data unit is a medium access control service data unit (MSDU) or an aggregated medium access control service data unit (A-MSDU).

6. A receiver, comprising:
   an interface configured to receive a data unit from a transmitter through a link; and
   a processor configured to determine that the data unit satisfies a preset link condition, wherein the preset link condition comprises:
   a link acknowledgement policy corresponding to the data unit in the link failing to be set to no acknowledgement, and a sequence number (SN) of the data unit in the link is greater than or equal to a start sequence number (SSN) in a block acknowledge (BA) frame for the link; and receiving status information of the data unit in the link is included in the BA frame, wherein the interface is further configured to:
   send the receiving status information of the data unit in the link to the transmitter through the link in response to the processor determining that the data unit in the link satisfies the preset link condition.

7. The receiver according to claim 6, wherein the data unit is a medium access control service data unit (MSDU) or an aggregated medium access control service data unit (A-MSDU).

8. A receiver, comprising:
   an interface configured to receive a data unit from a transmitter through a first link; and
   a processor configured to determine that a sequence number (SN) of the data unit being within a bitmap range of a scoreboard of a second link, wherein
   the interface is further configured to:
      send receiving status information of the data unit to the transmitter through the second link in response to the processor determining that the sequence number (SN) of the data unit being within the bitmap range of the scoreboard of the second link, wherein
      the scoreboard corresponds to the second link, and the receiving status information of the data unit is included in a block acknowledge (BA) frame.

9. The receiver according to claim 8, wherein the data unit is a medium access control service data unit (MSDU) or an aggregated medium access control service data unit (A-MSDU).

* * * * *

UNITED STATES PATENT AND TRADEMARK OFFICE
CERTIFICATE OF CORRECTION

| | | |
|---|---|---|
| PATENT NO. | : 12,355,569 B2 | Page 1 of 1 |
| APPLICATION NO. | : 17/939400 | |
| DATED | : July 8, 2025 | |
| INVENTOR(S) | : Yunbo Li et al. | |

It is certified that error appears in the above-identified patent and that said Letters Patent is hereby corrected as shown below:

On the Title Page

Replace the Abstract with the following:
A communication method includes receiving, by a receiver a data unit from a transmitter through a link, and sending, by the receiver receiving status information of the data unit to the transmitter through the link in response to the data unit satisfying a preset condition. The preset condition includes an acknowledgement policy corresponding to the data unit failing to be set to no acknowledgement, and a sequence number (SN) of the data unit being greater than or equal to a start sequence number (SSN) in a block acknowledge (BA) frame. The receiving status information of the data unit is included in the BA frame.

Signed and Sealed this
Seventh Day of October, 2025

John A. Squires
*Director of the United States Patent and Trademark Office*